(Model.)
L. A. SYVERUD.
GOPHER TRAP.
No. 449,011.     Patented Mar. 24, 1891.
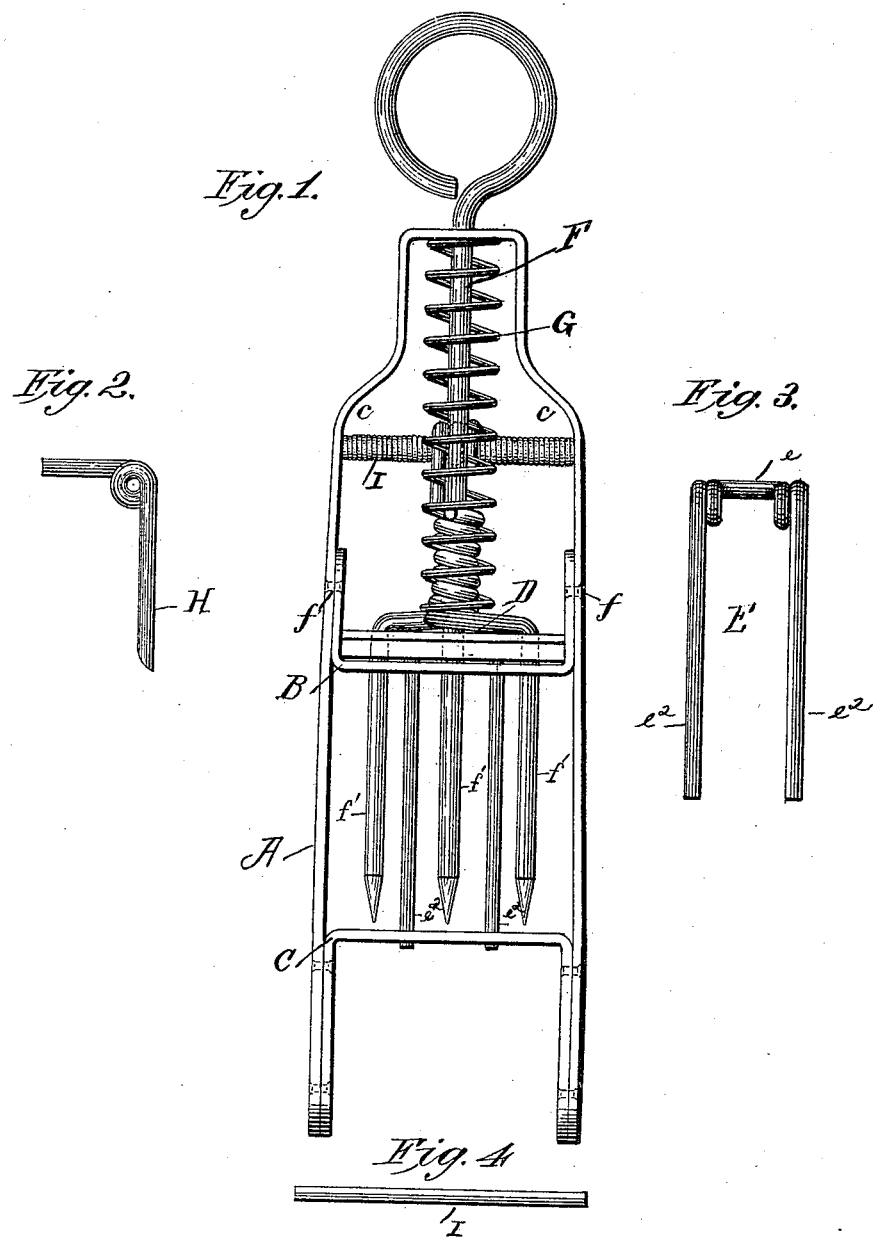
Witnesses:
O. O. Rudolph
A. L. Syverud
Inventor.
Lewis A. Syverud

UNITED STATES PATENT OFFICE.

LEWIS A. SYVERUD, OF CANTON, SOUTH DAKOTA.

GOPHER-TRAP.

SPECIFICATION forming part of Letters Patent No. 449,011, dated March 24, 1891.

Application filed September 22, 1890. Serial No. 365,855. (Model.)

*To all whom it may concern:*

Be it known that I, LEWIS A. SYVERUD, a citizen of the United States, residing at Canton, in the county of Lincoln and State of South Dakota, have invented a new and useful Gopher-Trap, of which the following is a specification.

My invention has relation to an improved mole or impalement trap.

The object is to devise a simple and cheaply-constructed trap which will be efficient in destroying animals as they pass along their run; and with these ends in view the invention consists in the improved construction and combination of parts, as hereinafter more fully set forth and described.

In the accompanying drawings, Figure 1 is a front elevation of the trap after the same has been sprung. Fig. 2 is a detail view of the dog. Fig. 3 is a detail view of the trigger, and Fig. 4 is a detail view of the transverse bar which carries the dog.

Referring to the drawings, the letter A indicates the main frame, which is of the peculiar shape shown in the drawings.

The letters B and C, respectively, indicate upper and lower transverse plates, the former provided with suitable guide-apertures and secured to the main frame at the points $b$ $b$.

Passing centrally through the main frame is an operating-lever F, said lever terminating at its lower ends in the prongs $f$, said prongs working through the guide-apertures of the upper transverse plate. Encircling this lever is a coiled spring G, which is disposed between the shoulders formed by the prongs and the under side of the top of the main frame.

The letter H indicates the dog, the construction of which is clearly indicated in Fig. 2. This dog turns freely upon an upper transverse rod I, said rod being secured to the main frame at the points $c$ $c$. It will be noticed that the short arm of this dog extends out horizontally, while the longer arm thereof extends down vertically.

The letter E indicates a trigger, which is mounted upon a transverse rod J, located back of the plate B. This trigger is shown in detail in Fig. 3, and is so coiled at its upper end as to form eyes, through which the rod passes, and is also formed with an inwardly-extending loop $e$.

The above being the construction of my invention, its operation is as follows: In order to set the trap, the lever is raised to its full extent, so that the short horizontal arm of the dog passes beneath the horizontal portion of the prongs, as indicated at D, Fig. 1, while the longer arm of the dog passes back of the loop $e$ of the trigger. It will be noticed that the lower ends of the arms $e^2$ $e^2$ of the trigger extend slightly below the lower plate C, so that when the animal passes beneath said plate after the device has been forced in the runway it will strike the projecting ends of the arms $e^2$ $e^2$ and, forcing said ends rearwardly or outwardly, will have the effect of releasing the loop $e$ from contact with the vertical arm of the dog, when of course the short horizontal arm of said dog will no longer be able to withstand the pressure of the coiled spring, which will therefore immediately upon the contact of the animal with the trigger force the prongs downward and impale the animal.

Having thus described my invention, what I claim, and desire to secure by Letters Patent of the United States, is—

An impalement-trap having an elongated frame, a forked rod extending therethrough, a spring encircling said rod above the fork, and a transverse rod supporting a bell-crank-shaped dog, one tooth of which engages the forked end of the rod, the opposite tooth thereof engaging a trigger which extends vertically in the path of a rodent, substantially as set forth.

LEWIS A. SYVERUD.

Witnesses:
O. A. RUDOLPH,
A. L. SYVERUD.